United States Patent
Han et al.

(10) Patent No.: US 11,231,859 B2
(45) Date of Patent: Jan. 25, 2022

(54) PROVIDING A RAID RESILIENCY SET FROM A PLURALITY OF STORAGE DEVICES

(71) Applicant: EMC IP Holding Company LLC, Hopkinton, MA (US)

(72) Inventors: Geng Han, Beijing (CN); Shuyu Lee, Acton, MA (US); Jian Gao, Beijing (CN); Hongpo Gao, Beijing (CN); Jamin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 16/666,972

(22) Filed: Oct. 29, 2019

(65) Prior Publication Data

US 2021/0124506 A1 Apr. 29, 2021

(51) Int. Cl.
*G06F 12/00* (2006.01)
*G06F 3/06* (2006.01)

(52) U.S. Cl.
CPC .......... *G06F 3/0631* (2013.01); *G06F 3/0619* (2013.01); *G06F 3/0644* (2013.01); *G06F 3/0689* (2013.01); *G06F 2212/262* (2013.01)

(58) Field of Classification Search
CPC combination set(s) only.
See application file for complete search history.

(56) References Cited

U.S. PATENT DOCUMENTS

| 8,799,705 | B2 | 8/2014 | Hallak et al. | |
|---|---|---|---|---|
| 9,367,395 | B1 | 6/2016 | Bono et al. | |
| 9,535,629 | B1 | 1/2017 | Desimone et al. | |
| 10,013,323 | B1 | 7/2018 | Puhov et al. | |
| 10,013,325 | B1 | 7/2018 | Garrett, Jr. et al. | |
| 10,241,712 | B1 | 3/2019 | Elliott, IV et al. | |
| 10,409,527 | B1 | 9/2019 | Foley | |
| 10,776,317 | B1 | 9/2020 | Veeraswamy et al. | |
| 11,023,147 | B2 | 6/2021 | Shang et al. | |
| 11,036,602 | B1 | 6/2021 | Tal | |
| 11,042,324 | B2 | 6/2021 | Shveidel et al. | |
| 11,061,770 | B1 | 7/2021 | Patel et al. | |
| 2018/0107383 | A1* | 4/2018 | Galbraith | G06F 11/1076 |
| 2019/0042103 | A1* | 2/2019 | Stabrawa | G06F 3/0632 |
| 2019/0235781 | A1* | 8/2019 | Gong | G06F 3/0607 |
| 2020/0026445 | A1* | 1/2020 | Wang | G06F 3/0689 |
| 2020/0241762 | A1* | 7/2020 | Gupta | G06F 3/0685 |
| 2020/0341645 | A1* | 10/2020 | Tang | G06F 3/0689 |
| 2021/0216225 | A1* | 7/2021 | Shang | G06F 3/0604 |

* cited by examiner

*Primary Examiner* — John A Lane
(74) *Attorney, Agent, or Firm* — BainwoodHuang (57) ABSTRACT

A technique provides a RAID resiliency set from a plurality of storage devices. The technique involves identifying a minimum sub-RRS width based on a predefined RAID level to be enforced on the RRS. The technique further involves, based on the minimum sub-RRS width, allocating segments from the plurality of storage devices to create a maximum number of sub-RRSs. The technique further involves forming the RRS from the created maximum number of sub-RRSs.

19 Claims, 8 Drawing Sheets

PROVIDING A RAID RESILIENCY SET FROM A PLURALITY OF STORAGE DEVICES

BACKGROUND

Some conventional data storage systems store host data within storage disks using a mapped-RAID (redundant array of independent disks) configuration on behalf of one or more hosts. Such a conventional data storage system may generate, as a fault domain within the mapped-RAID configuration, a RAID resiliency set (RRS) from a collection of storage disks using a conventional ladder approach.

In the conventional ladder approach, the conventional data storage system generates a sub-RRS from a portion of each storage disk regardless of the size of the storage disk. If there are storage disks with remaining space, the conventional data storage system generates another sub-RRS from a portion of each storage disk with remaining space, and so on (i.e., generating a ladder of sub-RRSs). The conventional data storage system continues to generate further sub-RRSs until there are not enough storage disks left to generate another sub-RRS (i.e., there are less remaining storage disks than the minimum sub-RRS width required by the particular RAID level imposed on the RRS). The conventional data storage system then merges the generated sub-RRSs into an RRS (i.e., a fault domain) to hold data.

SUMMARY

Unfortunately, there are deficiencies to the above-described conventional ladder approach that generates a redundant array of independent disks (RAID) resiliency set (RRS). In particular, the conventional ladder approach tends to waste space that could otherwise be used in the RRS.

Figure 1:
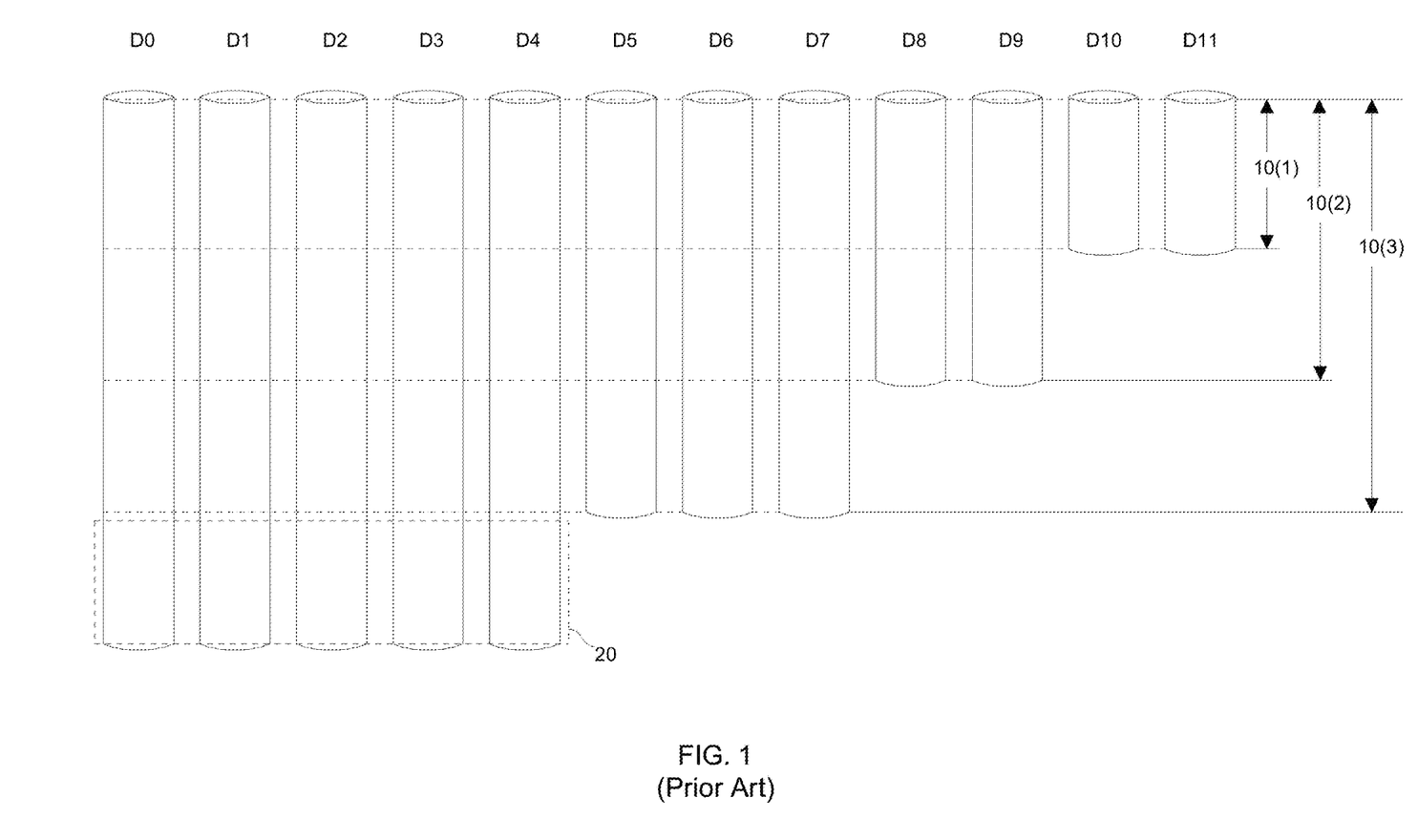
FIG. 1 is a block diagram of an example situation in which a conventional ladder approach is applied to a collection of storage disks to generate an RRS.

For example, as shown in FIG. 1, suppose that a conventional data storage system includes 12 storage disks D0, . . . , D11 of varying capacity. In particular, suppose that each storage disk D0, D1, D2, D3, and D4 has a capacity of 4 terabytes (TB). Additionally, suppose that each storage disk D5, D6, and D7 has a capacity of 3 TB. Furthermore, suppose that each storage disk D8 and D9 has a capacity of 2 TB. Also, suppose that each storage disk D10 and D11 has a capacity of 1 TB.

Further suppose that the conventional data storage system is tasked with generating, from the storage disks D0, . . . , D11, an RRS that provides RAID5(4+1) fault tolerance. In such a situation, the conventional data storage system will create sub-RRSs using the conventional ladder approach and eventually create uber slices within the sub-RRSs. In accordance with RAID5(4+1), each uber slice (or simply uber) has four data sections and one parity section, i.e., five sections. Accordingly, the minimum sub-RRS width is six (i.e., six storage disks) to enable the conventional data storage system to have at least five remaining storage disks in the event of a storage disk failure (i.e., one of the five sections of each uber must be on a different remaining storage disk).

In accordance with the conventional ladder approach, the conventional data storage system generates a sub-RRS from a portion of each storage disk D0, . . . , D11 regardless of the size of the storage disk. In particular, as shown in FIG. 1, the top most region of each storage disk D0, . . . , D11 is assigned to a first sub-RRS having a storage capacity 10(1) of 12 TB.

Since there are storage disks with remaining space, the conventional data storage system generates another sub-RRS from a portion of each storage drive with remaining space (i.e., storage disks D0, . . . , D9). Accordingly, the second top most region of each storage disk D0, . . . , D9 is assigned to a second sub-RRS having a storage capacity 10(2) of 10 TB.

Similarly, since there are still storage disks with remaining space, the conventional data storage system generates yet another sub-RRS from a portion of each storage drive with remaining space (i.e., storage disks D0, . . . , D7). Accordingly, the third top most region of each storage disk D0, . . . , D7 is assigned to a third sub-RRS having a storage capacity 10(3) of 8 TB.

At this point, there are still storage disks with remaining space, i.e., storage disks D0, . . . , D4. However, there are less remaining storage disks than the minimum sub-RRS width required by RAID5(4+1). That is, there are only five storage disks left and the minimum sub-RRS width is six. Since the conventional data storage system cannot generate another sub-RRS from the storage disks with remaining space, the conventional data storage system terminates generating sub-RRSs. Next, the conventional data storage system merges the three generated sub-RRSs into an RRS to hold data.

As shown in FIG. 1, the ladder of three sub-RRSs having capacities of 12 TB, 10 TB, and 8 TB generate an RRS having a total capacity of 30 TB. The remaining storage space 20 includes 5 TB. Unfortunately, this remaining storage space 20 is not consumed but instead is considered wasted.

In contrast to the above-described conventional ladder approach which tends to waste space that could otherwise be used in an RRS, improved techniques are directed to providing an RRS from a plurality of storage devices in a manner that attempts to create a maximum number of sub-RRSs. Creating the maximum number of sub-RRSs exposes more available capacity without compromising spare capability of the sub-RRSs (e.g., in response to a storage device failure, uber sections may be placed on different remaining storage devices to satisfy a predefined RAID level imposed on the RRS). Once the maximum number of sub-RRSs have been created, the RRS is formed from the created maximum number of sub-RRSs. Such techniques tend to waste less space than the conventional ladder approach to generating an RRS.

One embodiment is directed to a method of providing an RRS from a plurality of storage devices. The method includes identifying a minimum sub-RRS width based on a predefined RAID level to be enforced on the RRS. The method further includes, based on the minimum sub-RRS width, allocating segments from the plurality of storage devices to create a maximum number of sub-RRSs. The method further includes forming the RRS from the created maximum number of sub-RRSs.

In some arrangements, identifying the minimum sub-RRS width includes identifying a number of storage devices required by the predefined RAID level, and deriving the minimum sub-RRS width. The minimum sub-RRS width is based on the identified number of storage devices required by the predefined RAID level and a number of spare storage devices required to support data reconstruction in accordance with the predefined RAID level.

In some arrangements, allocating segments from the plurality of storage devices includes dividing storage capacity provided by the plurality of storage devices into segments, sorting the plurality of storage devices into ordered storage devices based on storage device size, and assigning segments from the ordered storage devices to empty sub-RRSs to construct the sub-RRSs. The size of the segments may be set equal to the capacity of the smallest storage device. However, there is no requirement that the segment size for each sub-RRS be the same.

In some arrangements, assigning the segments includes creating a first sub-RRS which is initially empty, and populating the first sub-RRS until the first sub-RRS includes a number of segments equal to the minimum sub-RRS width, after the first sub-RRS includes the number of segments equal to the minimum sub-RRS width. Assigning the segments further includes creating a second sub-RRS which is initially empty, and populating the second sub-RRS until the second sub-RRS includes a number of segments equal to the minimum sub-RRS width.

In some arrangements, populating the first sub-RRS includes adding (or incorporating) segments in the first sub-RRS from different storage devices to ensure that the first sub-RRS does not include multiple segments from a same storage device. Additionally, populating the first sub-RRS includes adding segments in the second sub-RRS from different storage devices to ensure that the second sub-RRS does not include multiple segments from a same storage device.

In some arrangements, allocating segments from the plurality of storage devices further includes, after each sub-RRS includes the number of segments equal to the minimum sub-RRS width, distributing remaining segments from the ordered storage devices among the sub-RRSs in compliance with the predefined RAID level. Such operation attempts to utilize remaining storage capacity of the plurality of storage devices.

In some arrangements, forming the RRS from the created maximum number of sub-RRSs includes combining the sub-RRSs to provide the RRS. The RRS is accordingly configured as a fault domain.

In some arrangements, the method further includes reserving a portion of each sub-RRS as spare space for use in response to a storage device failure, and utilizing another portion of each sub-RRS as available space for holding storage ubers. Accordingly, fault tolerant operations may be performed such as reconstructing information (e.g., data and parity) from a failed storage device and placing the reconstructed information in the spare space in accordance with the predefined RAID level.

In some arrangements, the plurality of storage devices includes a set of first storage devices, each first storage device having a first storage capacity. The plurality of storage devices further includes a set of second storage devices, each second storage device having a second storage capacity that is different from the first storage capacity. Additionally, in some arrangements, the second storage capacity is an integer multiple of the first storage capacity.

Another embodiment is directed to data storage equipment which includes memory, and control circuitry coupled to the memory. The memory stores instructions which, when carried out by the control circuitry, cause the control circuitry to provide an RRS from a plurality of storage devices by:
 (A) identifying a minimum sub-RRS width based on a predefined RAID level to be enforced on the RRS,
 (B) based on the minimum sub-RRS width, allocating segments from the plurality of storage devices to create a maximum number of sub-RRSs, and
 (C) forming the RRS from the created maximum number of sub-RRSs. Yet another embodiment is directed to a computer program product having a non-transitory computer readable medium which stores a set of instructions to provide an RRS from a plurality of storage devices. The set of instructions, when carried out by computerized circuitry, causes the computerized circuitry to perform a method of:
 (A) identifying a minimum sub-RRS width based on a predefined RAID level to be enforced on the RRS;
 (B) based on the minimum sub-RRS width, allocating segments from the plurality of storage devices to create a maximum number of sub-RRSs; and
 (C) forming the RRS from the created maximum number of sub-RRSs.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing an RRS from a plurality of storage devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing a redundant array of independent disks (RAID) resiliency set (RRS) in a manner that attempts to create a maximum number of sub-RRSs. Creating the maximum number of sub-RRSs exposes more available capacity while preserving the ability to utilize spare space within the sub-RRSs for fault tolerance (e.g., placing uber sections on a different remaining storage devices to satisfy a predefined RAID level imposed on the RRS). Once the maximum number of sub-RRSs have been created, the RRS is formed from the created maximum number of sub-RRSs. Such techniques tend to waste less space than a conventional ladder approach to generating an RRS.

Figure 2:
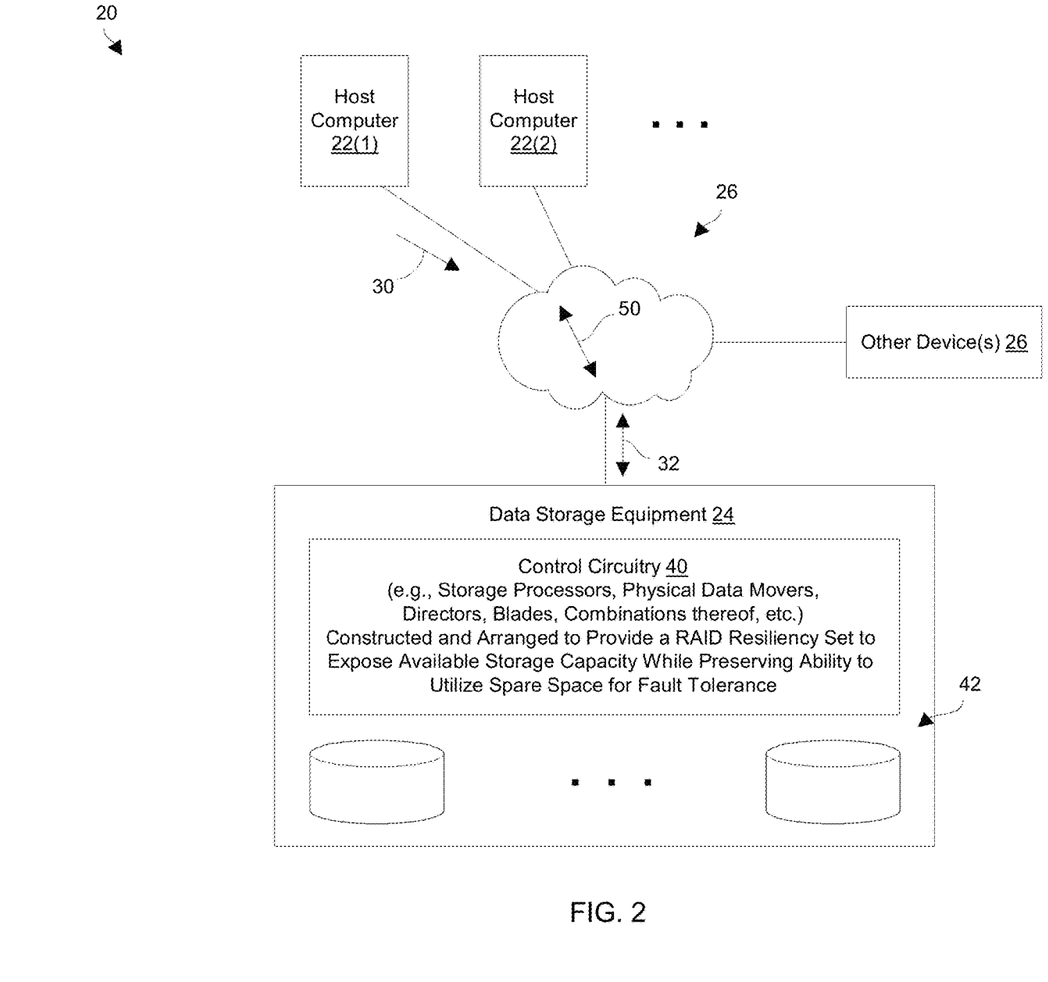
FIG. 2 is a block diagram of a data storage environment which provides an RRS to expose more available storage capacity while preserving the ability to utilize spare space for fault tolerance in accordance with certain embodiments.

FIG. 2 shows a data storage environment 20 which provides an RRS to enhance available storage capacity while preserving the ability to utilize spare space for fault tolerance. The data storage environment 20 includes host computers 22(1), 22(2), . . . (collectively, host computers 22), data storage equipment 24, one or more other devices 26, and a communications medium 28.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 includes control circuitry 40 and storage devices 42, e.g., solid state devices, magnetic disks, combinations thereof, etc. The control circuitry 40 may be formed by one or more physical storage processors, data movers, director boards, blades, combinations thereof, and so on. The control circuitry 40 is constructed and arranged to process the I/O requests 30 from the host computers 22 by robustly and reliably storing host data 32 within the storage devices 42 and retrieving the host data 32 from the storage devices 42. Additionally, as will be explained in further detail shortly, the control circuitry 40 imposes a mapped RAID structure on storage provided by the storage devices 42. In particular, the control circuitry 40 is able to form RRSs and, while doing so, attempts to create a maximum number of virtual sub-RRSs to expose more available capacity while preserving the ability to utilize spare space within the virtual sub-RRSs for fault tolerance.

In accordance with some embodiments, the control circuitry 40 of the data storage equipment 24 further supports hosting. That is, the control circuitry 40 provides a virtual server environment thus alleviating the need for external hosts although the data storage environment 20 may still include one or more host computers 22. In such embodiments, users and/or applications are able to operate directly within (i.e., are "unified" within) the data storage equipment 24. Such a unified storage situation may deliver file-based and/or block-based data storage services.

The one or more other devices 26 represent other components that may reside within the data storage environment 20. Such devices 26 may include user devices, management devices, backup/archiving devices, replication devices, and so on.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the control circuitry 40 of the data storage equipment 24 processes the I/O requests 30 from the host computers 22. In particular, the control circuitry 40 stores host data 32 in the storage devices 42 and loads host data 32 from the storage devices 42 on behalf of the host computers 22 and/or internal hosts.

To this end, the control circuitry 40 configures at least some of the storage provided by the storage devices 42 as one or more RRSs (i.e., fault domains) which enables data recovery/reconstruction in the event of a failed storage device 42. A variety of different RAID Levels are suitable for use for each RRS (e.g., RAID Level 1, RAID Level 5, RAID Level 6, RAID Level 10, etc.).

To form an RRS, the control circuitry 40 creates virtual sub-RRSs (or simply sub-RRSs) from the available storage. In particular, the control circuitry 40 attempts to maximize the number of created sub-RRSs and then forms the RRS from the created sub-RRSs. Maximizing the number of created sub-RRSs optimizes the amount of available storage in the RRS and reduces the amount of space that is wasted. Such operation is able to more efficiently capture space for RRSs than a conventional ladder approach. Further details will now be provided with reference to FIG. 3.

Figure 3:
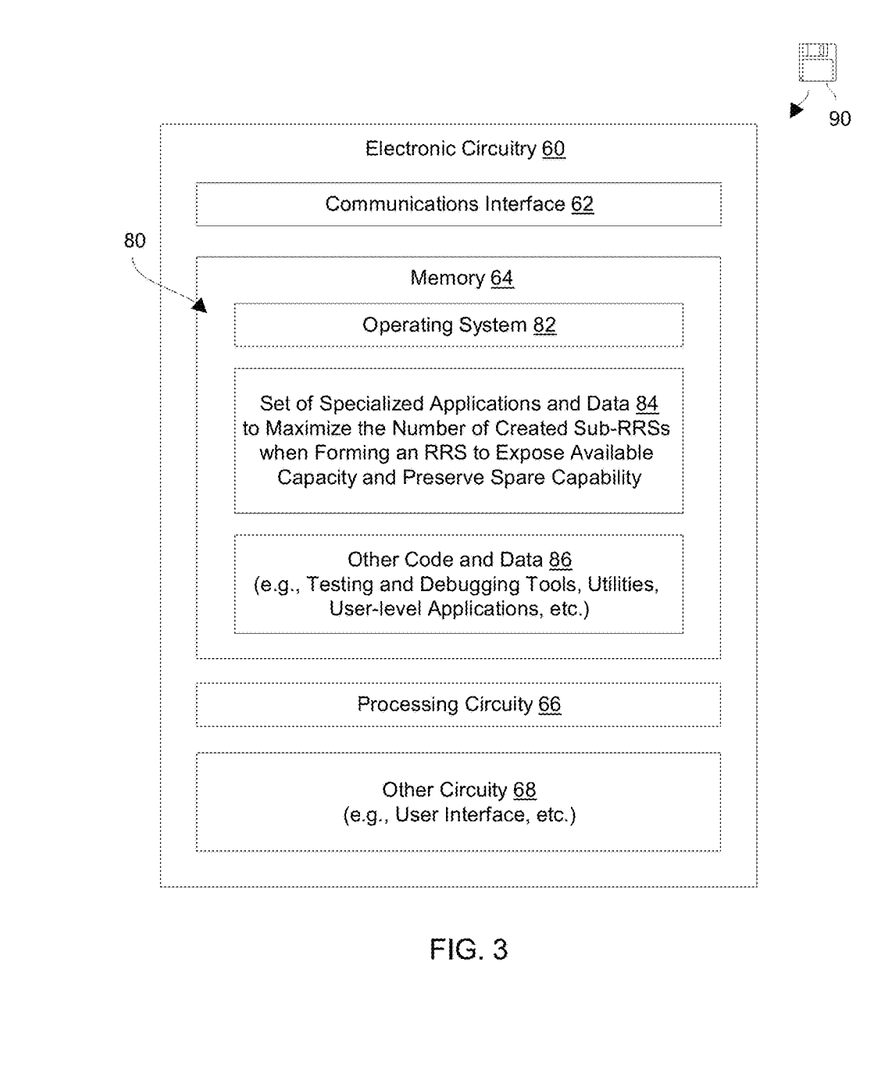
FIG. 3 is a block diagram of electronic circuitry of the data storage environment of FIG. 1 in accordance with certain embodiments.

FIG. 3 shows electronic circuitry 60 which is suitable for at least a portion of the control circuitry 40 of the data storage equipment 24 (also see FIG. 2) in accordance with certain embodiments. The electronic circuitry 60 includes a communications interface 62, memory 64, and processing circuitry 66, and other circuitry 68.

The communications interface 62 is constructed and arranged to connect the electronic circuitry 60 to the communications medium 28 (also see FIG. 2) to enable communications with other devices of the data storage environment 20 (e.g., the host computers 22, the other devices 26, etc.). Such communications may be IP-based, SAN-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 80 including an operating system 82, a set of specialized applications and data 84, and other applications and data 86. The operating system 82 is intended to refer to specialized code such as a kernel to manage resources of the electronic circuitry 60 (e.g., processor cycles, memory space, etc.), drivers, and so on. The set of specialized applications and data 84 includes specialized code that maximizes the number of created sub-RRSs when forming an RRS. The other applications and data 86 represent other constructs for other operations such as testing and debugging tools, software for a virtual server environment, user-level applications, other administrative tools, utilities, and so on.

The processing circuitry 66 is constructed and arranged to operate in accordance with the various software constructs 80 stored in the memory 64. In particular, the processing circuitry 66 operates in accordance with the set of specialized applications and data 84 to form specialized circuitry which, among other things, maximizes the number of created sub-RRSs when forming an RRS. Such specialized circuitry may be further implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 68 of the electronic circuitry 60 represents additional circuits, components, and other hardware such as a user interface (or terminal) that enables a user to enter commands and/or configure the electronic circuitry 60 for configuration changes, testing and diagnostics, and so on. Further details will now be provided with reference to FIGS. 4 through 6.

Figure 4:
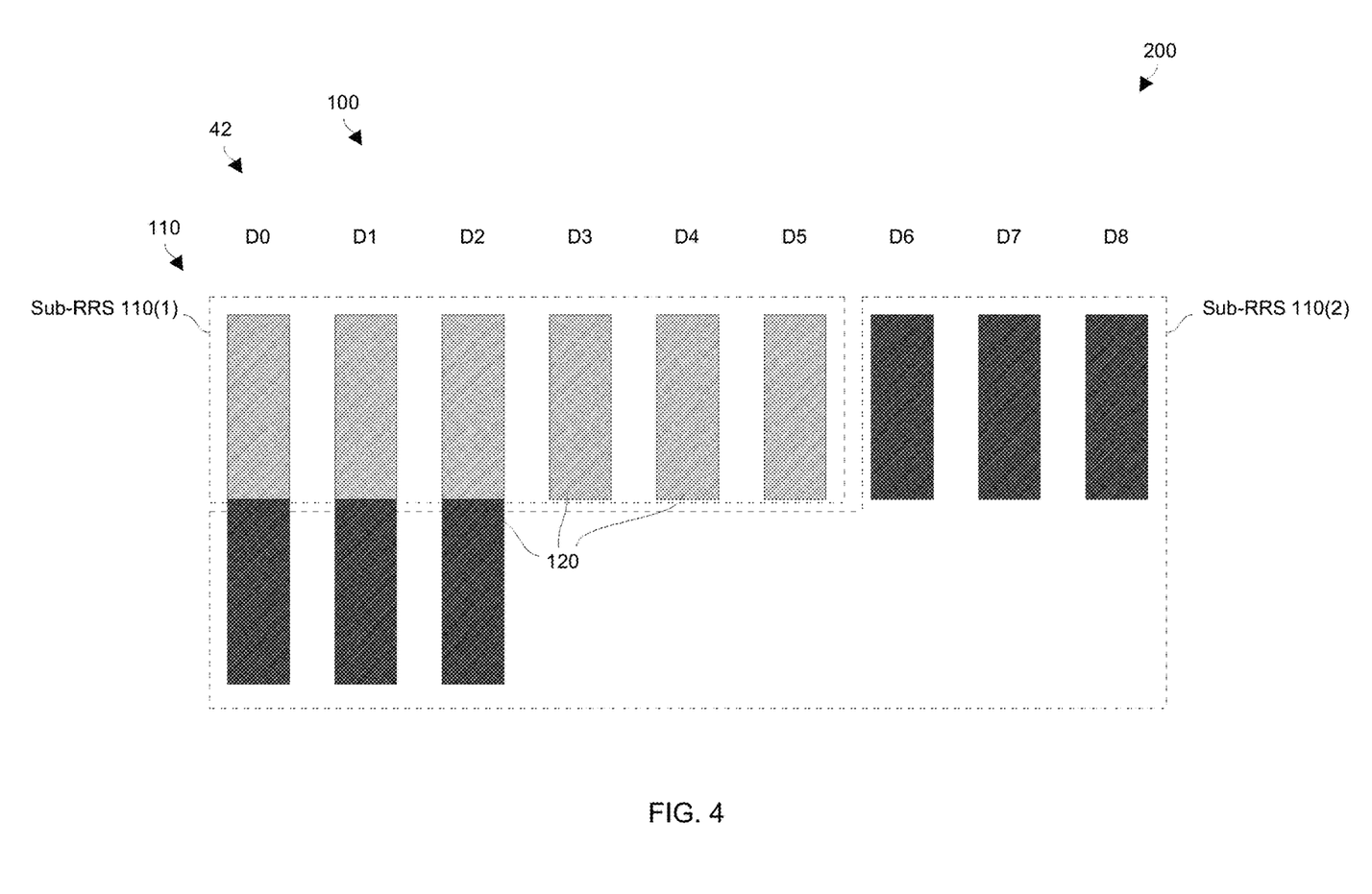
FIG. 4 is a block diagram of a first example in accordance with certain embodiments.
Figure 5:
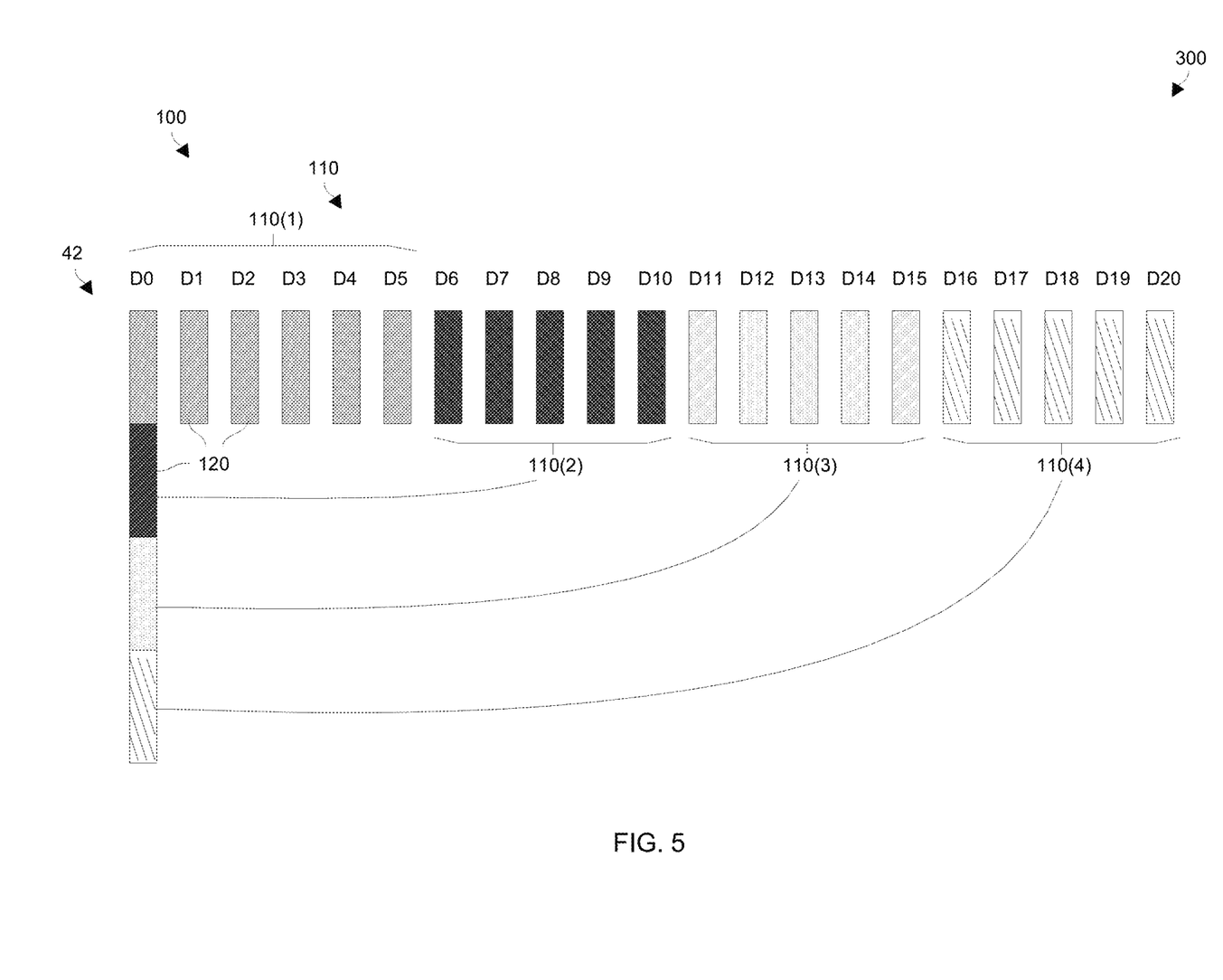
FIG. 5 is a block diagram of a second example in accordance with certain embodiments.
Figure 6:
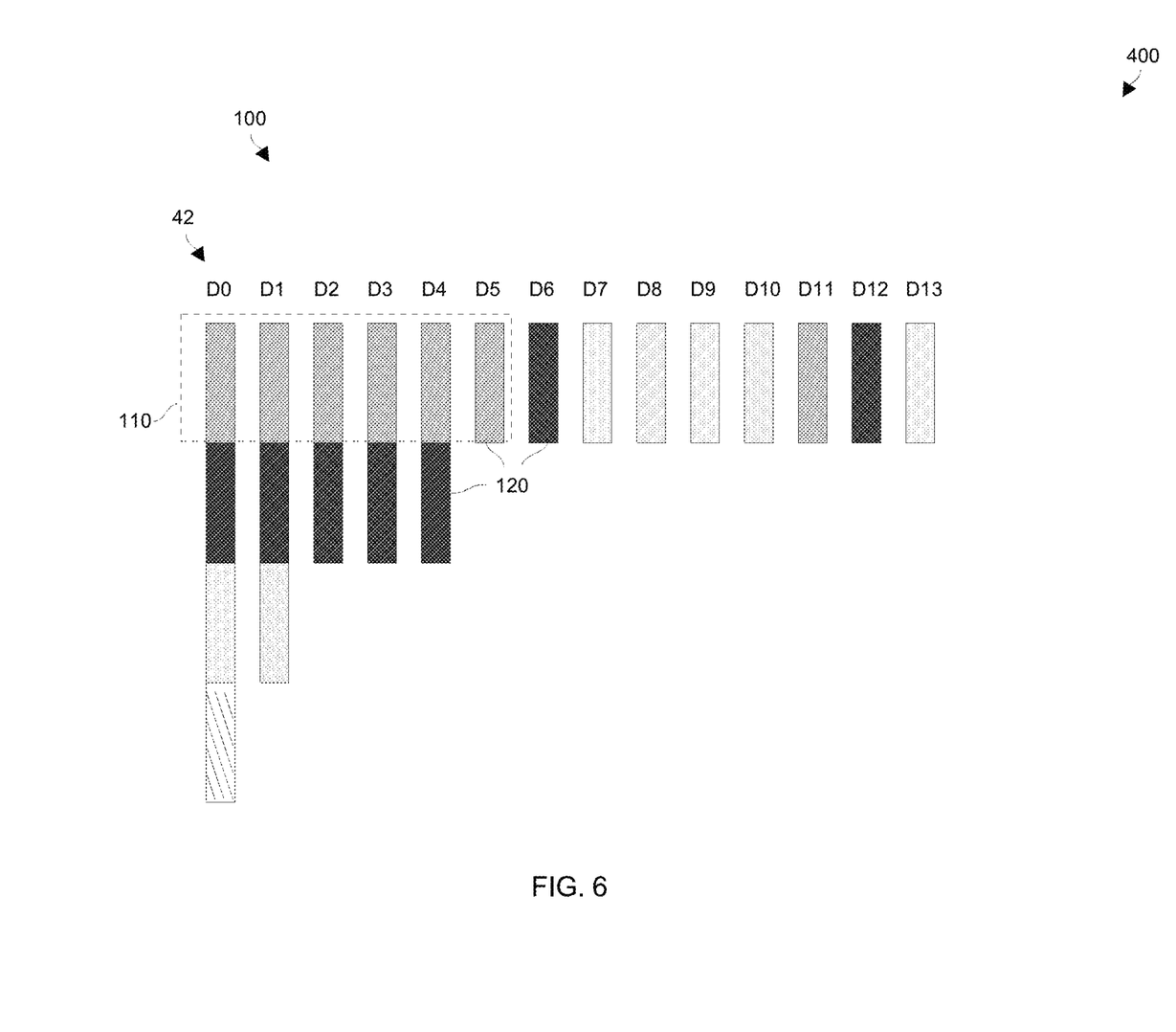
FIG. 6 is a block diagram of a third example in accordance with certain embodiments.

FIGS. 4 through 6 provide various examples for forming an RRS 100 by attempting to maximize the number of virtual sub-RRSs 110 in accordance with certain embodiments. FIG. 4 shows a first example 200 in accordance with certain embodiments. FIG. 5 shows a second example 300 in accordance with certain embodiments. FIG. 6 shows a third example 400 in accordance with certain embodiments.

With reference to FIG. 4, suppose that the data storage equipment 24 includes nine storage devices 42 (also see FIG. 2), i.e., storage devices D0, . . . , D8 and that the RRS 100 is to be formed (or built) in accordance with RAID5 (4+1). Along these lines, suppose that each storage device D0, D1, and D2 has a capacity of 2 terabytes (TB). Additionally, suppose that each storage device D3, D4, D5, D6, D7, and D8 has a capacity of 1 TB.

Since, in accordance with RAID5(4+1), each uber (i.e., a mapped RAID slice for holding information) has four data sections and one parity section (i.e., five sections) and since RAID5(4+1) is, by design, configured to prevent data loss after sustaining one storage device failure, the control circuitry 40 of the data storage equipment 24 imposes a minimum sub-RRS width equal to six. That is, six storage devices 42 (i.e., the number of storage devices for RAID5 (4+1) plus one storage device that will possibly fail) are required to preserve the RAID5(4+1) fault tolerance schema.

After the minimum sub-RRS width of six has been identified, the control circuitry 40 attempts to create the maximum number of sub-RRSs 110 from the storage devices 42. In particular, the control circuitry 40 determines that the storage devices 42 with the smallest capacity are 1 TB storage devices 42. Accordingly, the control circuitry 40 will attempt to create one or more sub-RRSs 110 using 1 TB as the segment size for each sub-RRS segment 120.

The control circuitry 40 then orders the storage devices 42 from largest to smallest. Accordingly, the storage devices D0, D1, and D2 are ahead in the order since they have larger 2 TB capacities, and the storage devices D3, D4, D5, D6, D7, and D8 are later in the order since they have smaller 1 TB capacities.

Next, the control circuitry 40 attempts to create sub-RRSs 110 having the minimum sub-RRS width starting at the beginning of the ordered storage devices 42. To this end, the control circuitry 40 determines that six 1 TB segments 120 are available from the first six storage devices 42 in the order. Accordingly, the control circuitry 40 creates the sub-RRS 110(1) from the 1 TB segments on storage devices D0, . . . , D5 (also see the lighter shaded segments 120 in FIG. 4).

It should be understood that the sub-RRS 110(1) uses 6 TB of storage capacity. In particular, 5 TB is available for storing information, and 1 TB is reserved as spare space in the event there is a failure of one of the storage devices D0, . . . , D5 (i.e., a portion of each storage device D0, . . . , D5 is reserved as spare space).

Subsequently, the control circuitry 40 attempts to create another sub-RRS 110 starting at the beginning of the ordered storage devices 42. To this end, the control circuitry 40 determines that three 1 TB segments 120 are available from the first three storage devices D0, D1, and D2 in the order, and that another three 1 TB segments 120 are available from the next storage devices 42 that have 1 TB segments 100 in the order, i.e., the storage devices D6, D7, and D8. Accordingly, the control circuitry 40 creates the sub-RRS 110(2) from the 1 TB segments 120 on storage devices D0, D1, D2, D6, D7, and D8 (also see the darker shaded segments 120 in FIG. 4).

Again, the sub-RRS 110(2) uses 6 TB of storage capacity. 5 TB is available for storing information, and 1 TB is reserved as spare space in the event there is a failure of one of the storage devices D0, D1, D2, D6, D7, and D8.

If there are still available segments 120, the control circuitry 40 continues attempting to create further sub-RRSs 110. Additionally, once the control circuitry 40 cannot create further sub-RRSs 110, the control circuitry 40 attempts to distribute remaining segments 120 among the created sub-RRSs 110 in order to utilize the available segments 120 as much as possible.

However, in the example 200, there are no available segments 120 left. Accordingly, in the example 200, consumption of the available space provided by the storage devices 42 is maximally efficient.

Once there are no available segments 120 left to allocate, the control circuitry 40 forms the RRS 100 from the created sub-RRSs 110. In the example 200, the control circuitry 40 creates an RRS 100 that uses 9 TB of storage capacity, and there is no wasted space.

It should be understood that the conventional ladder approach may not utilize storage capacity as efficiently. In particular, application of the conventional ladder approach to the storage devices D0, . . . , D8 would result in only one sub-RRS containing 1 TB segments 120 from each of the storage devices D0, . . . , D8. As a result, there would be a 1 TB segment 120 remaining on each storage device D0, D1, and D2 (i.e., 3 TB of space) that would be wasted. Further details will now be provided in connection with another example.

With reference to FIG. 5, suppose that the data storage equipment 24 includes 21 storage devices 42 (also see FIG. 2), i.e., storage devices D0, . . . , D20 and that the RRS 100 is to be formed (or built) in accordance with RAID5(4+1). Along these lines, suppose that the storage device D0 has a capacity of 4 TB. Additionally, suppose that each storage device D1, D2, . . . , D20 has a capacity of 1 TB.

As explained earlier, in accordance with RAID5(4+1), each uber has four data sections and one parity section (i.e., five sections). Additionally, since RAID5(4+1) is configured to prevent data loss after sustaining one storage device failure, the control circuitry 40 of the data storage equipment 24 identifies the minimum sub-RRS width as six. That is, six storage devices 42 are required to preserve the RAID5(4+1) fault tolerance schema.

After the minimum sub-RRS width has been identified, the control circuitry 40 attempts to create the maximum number of sub-RRSs 110 from the storage devices 42. In particular, the control circuitry 40 determines that the storage devices 42 with the smallest capacity are 1 TB storage devices 42. Accordingly, the control circuitry 40 will attempt to create one or more sub-RRSs 110 using 1 TB as the segment size for each sub-RRS segment 120.

The control circuitry 40 then orders the storage devices 42 from largest to smallest. Accordingly, the storage device D0 is ahead in the order since the storage device D0 has a larger 4 TB capacity, and the storage devices D1, ..., D20 are later in the order since they have smaller 1 TB capacities.

Next, the control circuitry 40 attempts to create sub-RRSs 110 starting at the beginning of the ordered storage devices 42. To this end, the control circuitry 40 determines that six 1 TB segments 120 are available from the first six storage devices 42 in the order. Accordingly, the control circuitry 40 creates the sub-RRS 110(1) from a 1 TB segment on each of the storage devices D0, ..., D5 (also see the lighter shaded segments 120 in FIG. 5).

One should appreciate that the sub-RRS 110(1) uses 6 TB of storage capacity. In particular, 5 TB is available for storing information, and 1 TB is reserved as spare space in the event there is a failure of one of the storage devices D0, ..., D5 (i.e., a portion of each storage device D0, ..., D5 is reserved as spare space).

Subsequently, the control circuitry 40 attempts to create another sub-RRS 110 starting at the beginning of the ordered storage devices 42. To this end, the control circuitry 40 determines that one 1 TB segment 120 is available from the storage device D0 in the order, and that another five 1 TB segments 120 are available from the next storage devices 42 that have 1 TB segments 100 in the order, i.e., the storage devices D6, ..., D10. Accordingly, the control circuitry 40 creates the sub-RRS 110(2) from the 1 TB segments 120 on storage devices D0, D6, D7, D8, D9, and D10 (also see the darker shaded segments 120 in FIG. 5).

Again, the sub-RRS 110(2) uses 6 TB of storage capacity. 5 TB is available for storing information, and 1 TB is reserved as spare space in the event there is a failure of one of the storage devices D0, ..., D5.

If there are still available segments 120, the control circuitry 40 continues attempting to create further sub-RRSs 110. Along these lines, the control circuitry 40 creates another sub-RRS 110(3) from a 1 TB segment 120 of the storage device D0, and 1 TB segments 120 of the storage devices D11, ..., D15 (also see the sparsely shaded segments 120 in FIG. 5). Additionally, the control circuitry 40 creates yet another sub-RRS 110(4) from a 1 TB segment 120 of the storage device D0, and 1 TB segments 120 of the storage devices D16, ..., D20 (also see the diagonally striped segments 120 in FIG. 5).

Once the control circuitry 40 cannot create further sub-RRSs 110, the control circuitry 40 attempts to distribute remaining segments 120 among the created sub-RRSs 110 in order to utilize the available segments 120 as much as possible. However, in the example 300, there are no available segments 120 left. Accordingly, in the example 300, consumption of the available space provided by the storage devices 42 is maximally efficient.

Once there are no available segments 120 left to allocate, the control circuitry 40 forms the RRS 100 from the created sub-RRSs 110. In the example 300, the control circuitry 40 creates an RRS 100 that uses 24 TB of storage capacity, and there is no wasted space.

One should again appreciate that the conventional ladder approach may not utilize storage capacity as efficiently. In particular, application of the conventional ladder approach to the storage devices D0, ..., D20 would result in only one sub-RRS 110 containing 1 TB segments 120 from each of the storage devices D0, ..., D20. Accordingly, the RRS 100 would contain 21 TB, and there would be 3 TB of space left (i.e., 3 TB of wasted space) on the storage device D0. Further details will now be provided in connection with another example.

With reference to FIG. 6, suppose that the data storage equipment 24 includes 14 storage devices 42 (also see FIG. 2), i.e., storage devices D0, ..., D13 and that the RRS 100 is to be formed (or built) in accordance with RAID5(4+1). Along these lines, suppose that the storage device D0 has a capacity of 4 TB. Additionally, suppose that the storage device D1 has a capacity of 3 TB. Furthermore, suppose that each storage device D2, ..., D4 has a capacity of 2 TB. Also, suppose that each storage device D5, ..., D13 has a capacity of 1 TB.

As explained above, in accordance with RAID5(4+1), each uber has four data sections and one parity section (i.e., five sections) and since RAID5(4+1) is configured to prevent data loss after sustaining one storage device failure, the control circuitry 40 of the data storage equipment 24 identifies the minimum sub-RRS width as six. That is, six storage devices 42 are required to preserve the RAID5(4+1) fault tolerance schema.

After the minimum sub-RRS width has been identified, the control circuitry 40 attempts to create the maximum number of sub-RRSs 110 from the storage devices 42. In particular, the control circuitry 40 determines that the storage devices 42 with the smallest capacity are 1 TB storage devices 42. As a result, the control circuitry 40 attempts to create one or more sub-RRSs 110 using 1 TB as the segment size for each sub-RRS segment 120.

The control circuitry 40 then orders the storage devices 42 from largest to smallest. Accordingly, the storage device D0 is first in the order since the storage device D0 has a largest 4 TB capacity. The storage device D1 is second in the order since the storage device D0 has a second largest 3 TB capacity. Additionally, the storage devices D2, ..., D4 are next in the order since they have the next largest 2 TB capacity. Furthermore, the storage devices D5, ..., D13 are last in the order since they have the smallest 1 TB capacity.

Next, the control circuitry 40 attempts to create sub-RRSs 110 starting at the beginning of the ordered storage devices 42. To this end, the control circuitry 40 determines that six 1 TB segments 120 are available from the first six storage devices 42 in the order. Accordingly, the control circuitry 40 creates a sub-RRS 110 from a 1 TB segment on each of the storage devices D0, ..., D5 (also see the lighter shaded segments 120 in FIG. 6).

One should appreciate that the sub-RRS 110 uses 6 TB of storage capacity. In particular, 5 TB is available for storing information, and 1 TB is reserved as spare space in the event there is a failure of one of the storage devices D0, ..., D5 (i.e., a portion of each storage device D0, ..., D5 is reserved as spare space).

Subsequently, the control circuitry 40 attempts to create another sub-RRS 110 starting at the beginning of the ordered storage devices 42. To this end, the control circuitry 40 determines that five 1 TB segment 120 are available from the storage devices D0, ..., D4 in the order, and that another 1 TB segment 120 is available from the storage device D6. Accordingly, the control circuitry 40 creates another sub-RRS 110 from the 1 TB segments 120 on storage devices D0, D1, D2, D3, D4, and D6 (also see the darker shaded segments 120 in FIG. 6). It should be understood that the storage device D5 could not be used in this second sub-RRS 110 because there was no (or not enough) remaining space on the storage device D5 even though the storage device D5 is ahead of the storage device D6 in the order.

Next, the control circuitry 40 attempts to create yet another sub-RRS 110 starting at the beginning of the ordered storage devices 42. To this end, the control circuitry 40 determines that two 1 TB segments 120 are available from the storage devices D0 and D1 in the order, no 1 TB segments 120 are available from storage devices D2, . . . , D6, and that four 1 TB segments 120 are available from the storage devices D7, . . . , D10. Accordingly, the control circuitry 40 creates another sub-RRS 110 from the 1 TB segments 120 on storage devices D0, D1, D7, D8, D9, and D10 (also see the sparsely shaded segments 120 in FIG. 6). Again, it should be understood that the storage devices D2, . . . , D6 could not be used in this sub-RRS 110 because there was no (or not enough) remaining space on the storage devices D2, . . . , D6 even though the storage devices D2, . . . , D6 are ahead of the storage devices D7, . . . , D10 in the order.

Since there are not enough available segments 120 left to create another sub-RRS 110 (there are only four segments 120 left), the control circuitry 40 attempts to distribute remaining segments 120 among the created sub-RRSs 110 in order to utilize the available segments 120 as much as possible. In the example 400, there are four available segments 120 left. Unfortunately, the unassigned 1 TB segment 120 on the storage device D0 cannot be allocated to any of the created sub-RRSs 110 since each created sub-RRS 110 already includes a 1 TB segment 120 on the storage device D0 (the same storage device 42 cannot have multiple segments 120 of the same sub-RRS 110).

However, the unassigned 1 TB segment 120 from the storage device D11 is allocated to the first sub-RRS 110 (lighter shaded) since each 1 TB segment 120 is on a different storage device 42. Similarly, the unassigned 1 TB segment 120 from the storage device D12 is allocated to the second sub-RRS 110 (darker shaded) since each 1 TB segment 120 is on a different storage device 42. Likewise, the unassigned 1 TB segment 120 from the storage device D13 is allocated to the last created sub-RRS 110 (sparsely shaded) since each 1 TB segment 120 is on a different storage device 42.

Once there are no available segments 120 left to allocate, the control circuitry 40 forms the RRS 100 from the created sub-RRSs 110. In the example 400, the control circuitry 40 creates an RRS 100 that uses 21 TB of storage capacity, and there is only 1 TB of wasted space (e.g., see the diagonally striped segment 120 in FIG. 6).

It should be understood that the conventional ladder approach may not utilize storage capacity as efficiently. In particular, application of the conventional ladder approach to the storage devices D0, . . . , D13 would result in only one sub-RRS 110 containing 1 TB segments 120 from each of the storage devices D0, . . . , D13. Accordingly, the RRS 100 would contain 14 TB, and there would be 8 TB of space left (i.e., 8 TB of wasted space) on the storage devices D0, . . . , D4. Further details will now be provided with reference to FIGS. 7 and 8.

Figure 7:
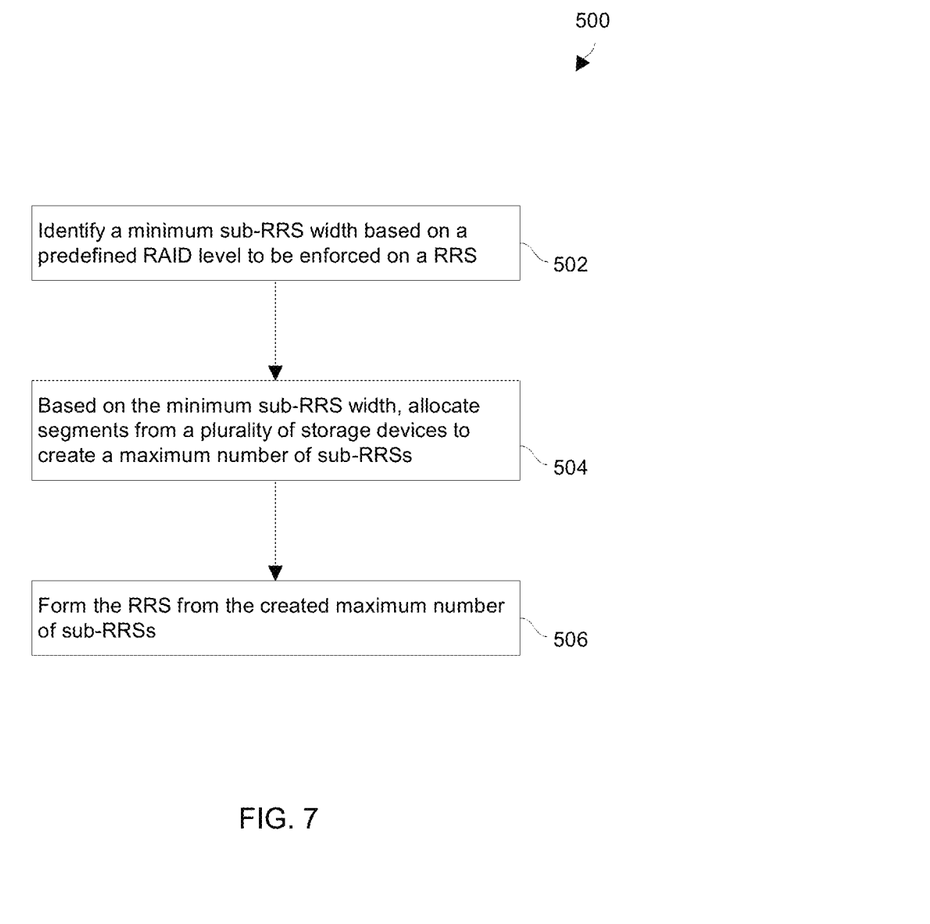
FIG. 7 is a flowchart of a procedure which is performed by the data storage environment of FIG. 1 in accordance with certain embodiments.
Figure 8:
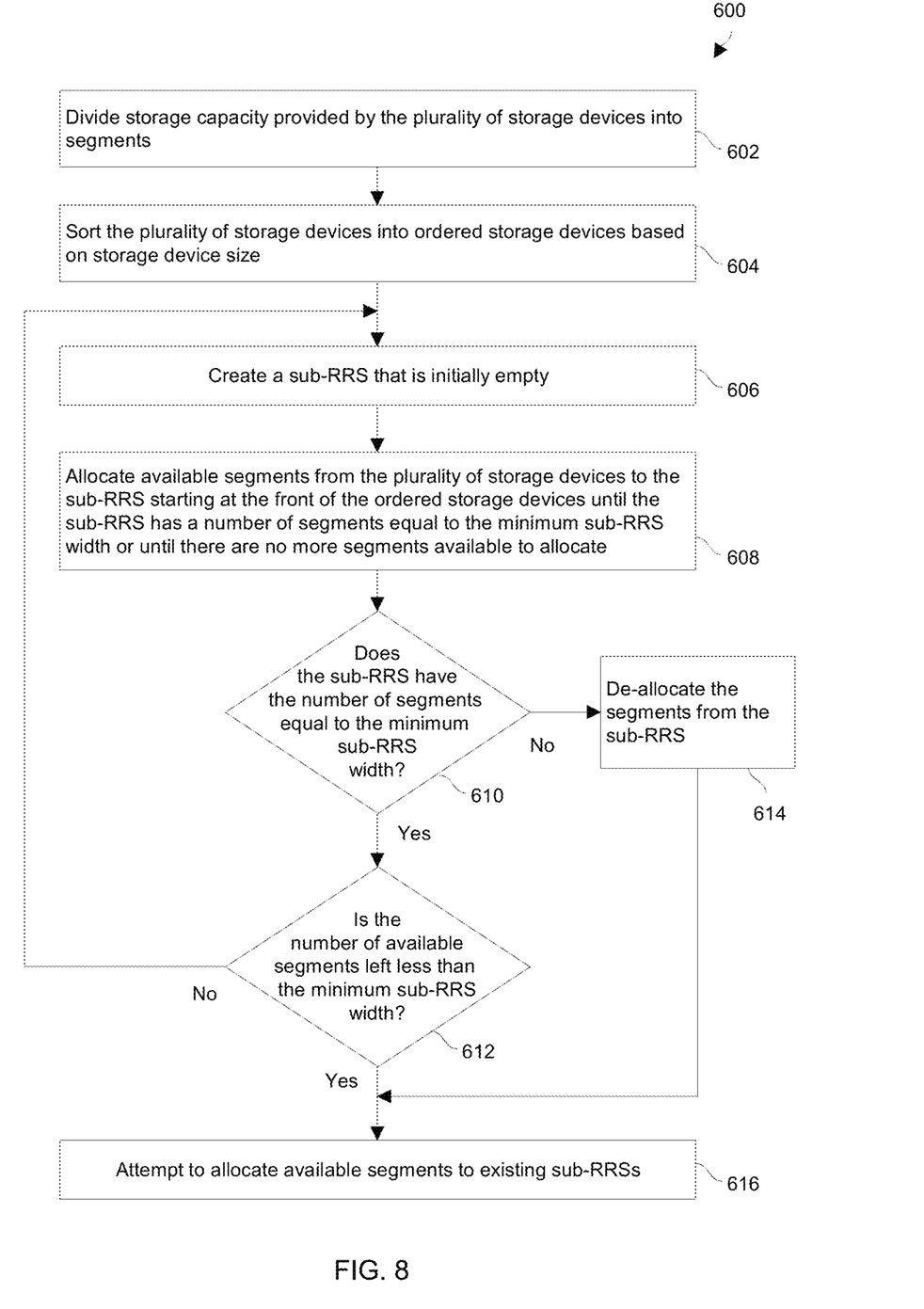
FIG. 8 is a flowchart of a procedure which is suitable for a particular activity in FIG. 7 in accordance with certain embodiments.

FIGS. 7 and 8 are flowcharts of particular processes that are performed within the data storage environment 20 in accordance with certain embodiments. FIG. 7 is a flowchart of a procedure 500 which is performed by the data storage equipment 24 to form an RRS. FIG. 8 is a flowchart of a procedure 600 which performed by the data storage equipment 24 to create the maximum number of sub-RRSs.

As shown in FIG. 7, the procedure 500 provides an RRS using a plurality of storage devices. The procedure 500 may be performed by various circuitry such as the control circuitry 40 of the data storage equipment 24 (FIG. 2).

At 502, the circuitry identifies a minimum sub-RRS width based on a predefined RAID level to be enforced on the RRS. Along these lines, the circuitry may identify a number of storage devices required by the predefined RAID level, and derive the minimum sub-RRS width based on the identified number of storage devices required by the predefined RAID level and a number of spare storage devices required to support data reconstruction in accordance with the predefined RAID level.

For example, RAID5(4+1) addresses the possibility of one failed storage device and thus imposes a minimum sub-RRS width of six (i.e., five storage devices for data and parity and one spare storage device). As another example, RAID5(8+1) has a RAID width of nine and addresses the possibility of one failed storage device thus imposing a minimum sub-RRS width of 10. As another example, RAID6(14+2) has a RAID width of 16 and addresses the possibility of two failed storage device thus imposing a minimum sub-RRS width of 18, and so on.

At 504, the circuitry allocates, based on the minimum sub-RRS width, segments from the plurality of storage devices to create a maximum number of sub-RRSs. As explained in connection with the earlier-discussed examples, the circuitry may divide storage capacity provided by the plurality of storage devices into segments, sort the plurality of storage devices into ordered storage devices based on storage device size, and assign segments from the ordered storage devices to empty sub-RRSs to construct the sub-RRSs. Further details of this activity in accordance with certain embodiments will be provided shortly. Each created sub-RRS contains space for holding storage ubers. Furthermore, each sub-RRS includes reserved spare space for use in response to a storage device failure.

At 506, the circuitry forms the RRS from the created maximum number of sub-RRSs. The RRS serves a fault domain when storing information within the data storage equipment 24.

As shown in FIG. 8 and in accordance with certain embodiments, the circuitry of the data storage equipment 24 (FIG. 2) is capable of performing a procedure 600 for use as at least a portion of the activity 504 in FIG. 7. In particular, the circuitry performs such a procedure 600 when attempting to create the maximum number of sub-RRSs.

At 602, the circuitry divides the available storage capacity provided by the plurality of storage devices into segments. In accordance with certain embodiments, at least some of the segments may be based on the capacity of the smallest storage device (e.g., where the capacity of each storage device is an integer multiple of the capacity of the smallest storage device).

At 604, the circuitry sorts the plurality of storage devices into an order (or ranking) based on storage device size. In particular, the largest storage device is first in the order and the smallest storage device is last in the order.

At 606, the circuitry creates a sub-RRS that is initially empty. Such a sub-RRS is ready to receive segment assignments.

At 608, the circuitry allocates available segments from the plurality of storage devices to the created sub-RRS. In particular, the circuitry starts at the front of the storage device order and allocates available segments until the sub-RRS has a number of segments equal to the minimum sub-RRS width or until there are no more segments available to allocate.

At 610, the circuitry determines whether the sub-RRS has the number of segments equal to the minimum sub-RRS width. If so, the circuitry proceeds to 612. Otherwise, the circuitry proceeds to 614.

At 612, if the sub-RRS has the number of segments equal to the minimum sub-RRS width, the circuitry determines whether the number of available segments left is less than the minimum sub-RRS width. If so, the circuitry proceeds to 616. Otherwise, the circuitry proceeds back to 606.

At 614, if the sub-RRS does not have the number of segments equal to the minimum sub-RRS width, the circuitry de-allocates the segments from the sub-RRS and proceeds to 616. Such de-allocation occurs when there are not enough segments to properly create a sub-RRS to support the predefined RAID level.

When 612 returns to 606 from 612, the circuitry has finished creating a sub-RRS and tries to create another sub-RRS. The procedure 600 may return back to 606 multiple times depending on the available segments.

At 616, when the number of available segments is less than the minimum sub-RRS width (from 612) or after segments have been de-allocated from a sub-RRS because the sub-RRS did not have the number of segments equal to the minimum sub-RRS width (from 614), the circuitry attempts to allocate the available segments to existing sub-RRSs. Such allocation may result in one or more of the created sub-RRSs having more segments than the minimum sub-RRS width.

At 616, it should be understood that the circuitry is careful to ensure that the segment of each sub-RRS is on a different storage device in accordance with the predefined RAID level. In some situations, there may one or more segments that cannot be allocated to any sub-RRS. However, the procedure 600 nevertheless attempts to expose more RRS available capacity and minimize wasted space.

As described above, improved techniques are directed to providing an RRS 100 from a plurality of storage devices 42 in a manner that attempts to create a maximum number of sub-RRSs 110. Creating the maximum number of sub-RRSs 110 exposes more available capacity without compromising spare capability of the sub-RRSs 110 (e.g., placing uber sections on a different remaining storage devices 42 to satisfy a predefined RAID level imposed on the RRS 100). Once the maximum number of sub-RRSs 110 have been created, the RRS 100 is formed from the created maximum number of sub-RRSs 110. Such techniques tend to waste less space than the conventional ladder approach.

One should appreciate that the above-described techniques do not merely algorithmically allocate space. Rather, the disclosed techniques involve improvements to the technology of data storage by minimizing wasted space, provisioning space smartly to enable fault tolerance operations in response to storage device failure, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Explained herein, in accordance with certain embodiments, is an alternative technique to constructing an RRS with different capacity storage devices. Such a technique enables building the RRS from the maximum of available capacity exposed from storage devices compared to existing approaches.

Such a technique maximizes or exposes more usable capacity for use compared to conventional approaches that involve application of a ladder algorithm which is purely performance optimized. In accordance with certain embodiments, the particular mechanism used to provide an RRS (e.g., the ladder algorithm, maximizing the number of RRSs, etc.) may be controlled via policy. Along these lines, the particular mechanism can be selected, changed, combined, etc.

One should appreciate that with certain techniques disclosed herein, the data storage equipment may:

Fully utilize capacity of the larger storage devices (e.g., it is not necessary to ask customers to add more large drives but instead adding smaller drives could be added to achieve the same result).

It is not necessary to waste as much storage space as the conventional ladder algorithm does, especially in a situation which uses five large drives.

A physical RRS may be broken into a set of virtual sub-RRS to calculate the available capacity, and with the sub-RRS to guide uber allocation.

A general 2-step work flow may involve breaking drives into segments, and organizing the segments into virtual sub-RRS.

At certain locations within this document, minimum width refers to the minimum number of drives in one RRS to support a mapped RAID uber allocation. In some embodiments, the minimum width is the value of "raid width +1".

Additionally, the term "physical capacity" refers to the storage capacity of one storage device (or drive).

Furthermore, the term "effective capacity" refers to the consumable capacity for one storage device which may be less than the physical capacity in some cases, and which may be subject to the RAID width.

Also, in terms of reserved spare capacity, it should be understood that, for each RRS, the circuitry may reserve some capacity for a spare. This reserved capacity may be worth the maximum effective capacity in the RRS.

In accordance with certain embodiments, the maximum common divisor of the capacity is determined among the drives in the RRS. Generally the largest drive capacity is always a multiple of smallest drive capacity in the RRS. So it may be acceptable to select the smallest drive capacity in the RRS as the common divisor. Accordingly, the segment size is set to be the maximum common divisor of the capacities.

The next part of the process is to organize segments into sub-RRSs. Here, each drive is broken into a set of segments. The segments are then allocated to virtual sub-RRS with the following steps:
1. Sort the drives in the descending order by the drive capacity.
2. Break the drives into 2 parts, the first raid width number of drives are put into part_1 and the rest to part_2.
3. Generate an empty virtual sub-$RRS_0$
4. Select the 1st segment from the largest drive, the 2nd segment from the drive next to the largest drive in the order, etc. Keep doing this until the new created virtual sub-RRS has minimum number of segments.
  a. If the newly generated sub-RRS is successfully filled with minimum number of segments. Then go to step 5)
  b. If the available segments are exhausted and the sub-RRS is not successfully filled with minimum number of segments, then the segments of the sub-RRS are released. That is, the segments of that sub-RRS are returned to being unassigned. Then go to step 6)
5. Check if all the segments in part_1 has been put into virtual sub-RRS?
  a. If yes, then go to step 6)
  b. If not, then back to step 3 to continue.
6. Loop over all the un-assigned segments, try to assign it to one sub-RRS with the following rule:
If there is another segment on this drive already has been put into the sub-RRS, then this sub-RRS is not a candidate. Instead we will try other sub-RRS. If there are multiple candidates could be put into, then we will select the sub-RRS with less segments. Keep doing this until all the un-assigned segments have been handled.
7. It this point is reached and there are still some segments are not assigned, those segments are not consumable.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that each sub-RRS may have segments of a different size. That is, a first sub-RRS may have segments of a first size, a second sub-RRS may have segments of a second size that is different from the first size, and so on. Such modifications and enhancements, as well as others, are intended to belong to various embodiments of the disclosure.

What is claimed is:

1. A method of providing a redundant array of independent disks (RAID) resiliency set (RRS) from a plurality of storage devices, the method comprising:
  identifying a minimum sub-RRS width based on a predefined RAID level to be enforced on the RRS;
  based on the minimum sub-RRS width, allocating segments from the plurality of storage devices to create a maximum number of sub-RRSs; and
  forming the RRS from the created maximum number of sub-RRSs;
  wherein the plurality of storage devices includes a set of first storage devices, each first storage device having a first storage capacity;
  wherein the plurality of storage devices includes a set of second storage devices, each second storage device having a second storage capacity that is smaller than the first storage capacity; and
  wherein allocating segments from the plurality of storage devices includes:
    ordering the plurality of storage devices to form an order in which the set of first storage devices is ahead of the set of second storage devices in the formed order, and
    allocating the segments from the plurality of storage devices based on the formed order.

2. A method as in claim 1 wherein identifying the minimum sub-RRS width includes:
  identifying a number of storage devices required by the predefined RAID level, and
  deriving the minimum sub-RRS width based on the identified number of storage devices required by the predefined RAID level and a number of spare storage devices required to support data reconstruction in accordance with the predefined RAID level.

3. A method as in claim 1 wherein allocating segments from the plurality of storage devices further includes:
  dividing storage capacity provided by the plurality of storage devices into segments,
  the segments being assigned from the plurality of storage devices to empty sub-RRSs to construct the sub-RRSs.

4. A method as in claim 3 wherein allocating the segments from the plurality of storage devices based on the formed order includes:
  creating a first sub-RRS which is initially empty,
  populating the first sub-RRS until the first sub-RRS includes a number of segments equal to the minimum sub-RRS width,
  after the first sub-RRS includes the number of segments equal to the minimum sub-RRS width, creating a second sub-RRS which is initially empty, and
  populating the second sub-RRS until the second sub-RRS includes a number of segments equal to the minimum sub-RRS width.

5. A method as in claim 4 wherein populating the first sub-RRS includes:
  including segments in the first sub-RRS from different storage devices to ensure that the first sub-RRS does not include multiple segments from a same storage device; and
wherein populating the first sub-RRS includes:
  including segments in the second sub-RRS from different storage devices to ensure that the second sub-RRS does not include multiple segments from a same storage device.

6. A method as in claim 3 wherein allocating segments from the plurality of storage devices further includes:
  after each sub-RRS includes the number of segments equal to the minimum sub-RRS width, distributing remaining segments from the ordered storage devices among the sub-RRSs in compliance with the predefined RAID level to utilize remaining storage capacity of the plurality of storage devices.

7. A method as in claim 1 wherein forming the RRS from the created maximum number of sub-RRSs includes:
  combining the sub-RRSs to provide the RRS, the RRS being configured as a fault domain.

8. A method as in claim 1, further comprising:
  reserving a portion of each sub-RRS as spare space for use in response to a storage device failure, and
  utilizing another portion of each sub-RRS as available space for holding storage ubers.

9. A method as in claim 1 wherein the first storage capacity is an integer multiple of the second storage capacity.

10. Data storage equipment, comprising:
memory; and
control circuitry coupled to the memory, the memory storing instructions which, when carried out by the control circuitry, cause the control circuitry to provide a redundant array of independent disks (RAID) resiliency set (RRS) from a plurality of storage devices by:
identifying a minimum sub-RRS width based on a predefined RAID level to be enforced on the RRS,
based on the minimum sub-RRS width, allocating segments from the plurality of storage devices to create a maximum number of sub-RRSs, and
forming the RRS from the created maximum number of sub-RRSs;
wherein the plurality of storage devices includes a set of first storage devices, each first storage device having a first storage capacity;
wherein the plurality of storage devices includes a set of second storage devices, each second storage device having a second storage capacity that is smaller than the first storage capacity; and
wherein allocating segments from the plurality of storage devices includes:
ordering the plurality of storage devices to form an order in which the set of first storage devices is ahead of the set of second storage devices in the formed order, and
allocating the segments from the plurality of storage devices based on the formed order.

11. Data storage equipment as in claim 10 wherein identifying the minimum sub-RRS width includes:
identifying a number of storage devices required by the predefined RAID level, and
deriving the minimum sub-RRS width based on the identified number of storage devices required by the predefined RAID level and a number of spare storage devices required to support data reconstruction in accordance with the predefined RAID level.

12. Data storage equipment as in claim 11 wherein allocating segments from the plurality of storage devices further includes:
dividing storage capacity provided by the plurality of storage devices into segments,
the segments being assigned from the plurality of storage devices to empty sub-RRSs to construct the sub-RRSs.

13. Data storage equipment as in claim 12 wherein allocating the segments from the plurality of storage devices based on the formed order includes:
creating a first sub-RRS which is initially empty,
populating the first sub-RRS until the first sub-RRS includes a number of segments equal to the minimum sub-RRS width,
after the first sub-RRS includes the number of segments equal to the minimum sub-RRS width, creating a second sub-RRS which is initially empty, and
populating the second sub-RRS until the second sub-RRS includes a number of segments equal to the minimum sub-RRS width.

14. Data storage equipment as in claim 13 wherein populating the first sub-RRS includes:
including segments in the first sub-RRS from different storage devices to ensure that the first sub-RRS does not include multiple segments from a same storage device; and
wherein populating the first sub-RRS includes:
including segments in the second sub-RRS from different storage devices to ensure that the second sub-RRS does not include multiple segments from a same storage device.

15. Data storage equipment as in claim 14 wherein allocating segments from the plurality of storage devices further includes:
after each sub-RRS includes the number of segments equal to the minimum sub-RRS width, distributing remaining segments from the ordered storage devices among the sub-RRSs in compliance with the predefined RAID level to utilize remaining storage capacity of the plurality of storage devices.

16. Data storage equipment as in claim 15 wherein forming the RRS from the created maximum number of sub-RRSs includes:
combining the sub-RRSs to provide the RRS, the RRS being configured as a fault domain.

17. Data storage equipment as in claim 15, further comprising:
reserving a portion of each sub-RRS as spare space for use in response to a storage device failure, and
utilizing another portion of each sub-RRS as available space for holding storage ubers.

18. Data storage equipment as in claim 10 wherein the first storage capacity is an integer multiple of the first second storage capacity.

19. A computer program product having a non-transitory computer readable medium which stores a set of instructions to provide a redundant array of independent disks (RAID) resiliency set (RRS) from a plurality of storage devices; the set of instructions, when carried out by computerized circuitry, causing the computerized circuitry to perform a method of:
identifying a minimum sub-RRS width based on a predefined RAID level to be enforced on the RRS;
based on the minimum sub-RRS width, allocating segments from the plurality of storage devices to create a maximum number of sub-RRSs; and
forming the RRS from the created maximum number of sub-RRSs;
wherein the plurality of storage devices includes a set of first storage devices, each first storage device having a first storage capacity;
wherein the plurality of storage devices includes a set of second storage devices, each second storage device having a second storage capacity that is smaller than the first storage capacity; and
wherein allocating segments from the plurality of storage devices includes:
ordering the plurality of storage devices to form an order in which the set of first storage devices is ahead of the set of second storage devices in the formed order, and
allocating the segments from the plurality of storage devices based on the formed order.

* * * * *